(No Model.)

H. G. MORRIS.
SECONDARY BATTERY.

No. 577,771. Patented Feb. 23, 1897.

Witnesses:
Chas. H. e. Cow.
Will. A. Barr.

Inventor:
Henry G. Morris
by his Attorneys
Howson & Howson

UNITED STATES PATENT OFFICE.

HENRY G. MORRIS, OF PHILADELPHIA, PENNSYLVANIA.

SECONDARY BATTERY.

SPECIFICATION forming part of Letters Patent No. 577,771, dated February 23, 1897.

Application filed September 5, 1895. Serial No. 561,538. (No model.)

*To all whom it may concern:*

Be it known that I, HENRY G. MORRIS, a citizen of the United States, residing in Philadelphia, Pennsylvania, have invented certain Improvements in Secondary Batteries, of which the following is a specification.

The object of my invention is to so construct a secondary battery that the plates will be suspended within the jar or receptacle containing the elements.

A further object of my invention is to divide the elements in sections, held together by necks which allow for the free expansion and contraction of the supporting-grid and for the free circulation of liquor, thus dispensing with the retaining-frame heretofore used in securing together sectional plates.

Figure 1:
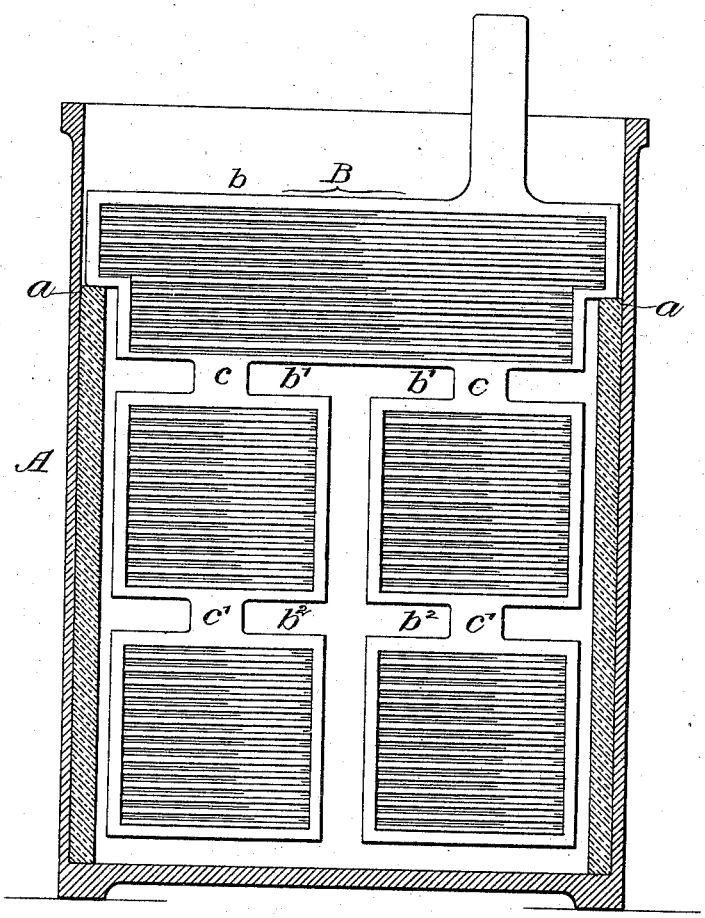
Figure 2:
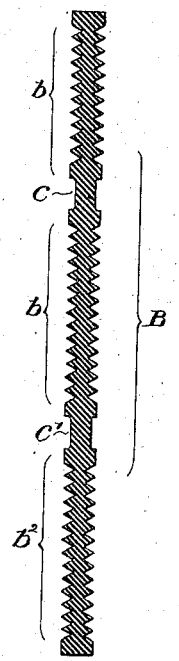
Figure 3:
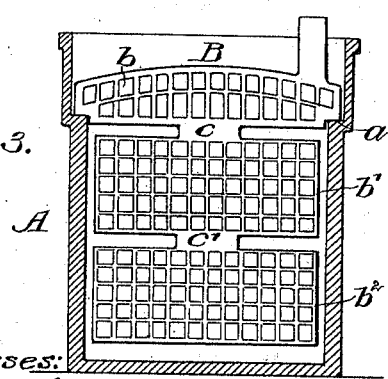
Figure 4:
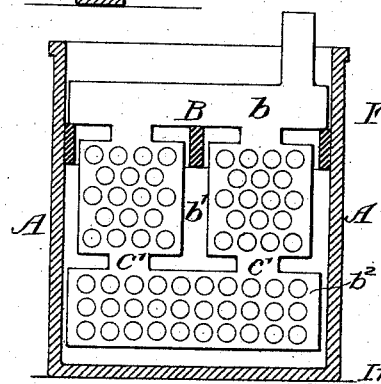

In the accompanying drawings, Figure 1 is a sectional view of the vessel, illustrating a secondary-battery plate made in accordance with my invention. Fig. 2 is a sectional view through the plate, which is of a type in which the active material is formed by electrolysis. Fig. 3 is a view of a modification showing a different form of element and illustrating a supporting-grid for containing active material in the form of a paste. Fig. 4 is another modification illustrating a battery in which the supporting medium is cast around pellets of active material.

It will be understood that my invention can be applied to all types of secondary batteries.

Heretofore it has been the usual practice, when sectional plates were used, to assemble a series of the sections in a frame and so secure them that each section was free to expand or contract within the frame. This construction was very expensive and therefore objectionable.

A is the containing-vessel, and in this vessel are supports $a\, a$, of glass or other non-conducting material, for supporting the battery-plates B, and, as shown in Figs. 1 and 2, each plate B has an upper section $b$ in the form of a beam, which rests upon the supports $a$, and from this beam are suspended the sections $b'$ and $b^2$. Each section $b'$ is connected to the beam-section $b$ by a neck $c$, and the sections $b^2$ are connected to the sections $b'$ by necks $c'$. Each of the sections $b\, b'\, b^2$ have ribbed faces in the present instance, as shown in Fig. 2, so that when the plate is subjected to electrolytic action the active material will be formed thereon. Thus it will be seen that the entire plate is suspended from the cross-beam $b$ and the fluid is free to circulate around and under the plate, and by making the plate in sections each section is allowed to expand and contract without interfering with the other sections.

In Fig. 3 I have illustrated my invention in connection with a grid having cells for the reception of active material in the form of paste, and in this figure I have shown the beam-section mounted on shoulders $a'$ on the vessel A.

In Fig. 4 I have illustrated a plate in which the supporting material is cast around pellets of active material, it being understood, however, that I do not limit myself to any specific class of secondary batteries, as the plates may be made in any form, depending upon the character of work for which the battery is intended.

In Fig. 3 I have shown the beam arched and in Fig. 4 I have shown the beam plain and supported at the center, though I prefer to utilize the beam as part of the active element of the battery.

I claim as my invention—

1. The combination in a secondary battery, of the cell having supports therein below the liquor-level, a battery-plate consisting of two or more sections connected together by necks, the upper section being in the form of a beam from which the other section or sections are suspended, said beam-section being part of the active plate within the liquor and resting upon the supports within the cell, substantially as described.

2. A secondary-battery plate consisting of the beam-section $b$ resting on supports in a containing vessel, sections $b'$ suspended from the beam-section $b$ by necks $c$ and sections $b^2$ suspended from the sections $b'$ by necks $c'$, substantially as described.

In testimony whereof I have signed my name to this specification in the presence of two subscribing witnesses.

HENRY G. MORRIS.

Witnesses:
 WILL. A. BARR,
 JOS. H. KLEIN.